United States Patent
Lee et al.

(10) Patent No.: US 10,020,549 B2
(45) Date of Patent: Jul. 10, 2018

(54) BATTERY MODULE WITH NOVEL STRUCTURE

(71) Applicant: LG CHEM, LTD., Seoul (KR)

(72) Inventors: Bum Hyun Lee, Daejeon (KR); Dal Mo Kang, Daejeon (KR); Yong Seok Choi, Daejeon (KR); Jaemin Lee, Yongin-si (KR)

(73) Assignee: LG CHEM, LTD., Seoul (KR)

( * ) Notice: Subject to any disclaimer, the term of this patent is extended or adjusted under 35 U.S.C. 154(b) by 833 days.

(21) Appl. No.: 14/266,446

(22) Filed: Apr. 30, 2014

(65) Prior Publication Data

US 2014/0234691 A1    Aug. 21, 2014

Related U.S. Application Data

(63) Continuation of application No. PCT/KR2013/000497, filed on Jan. 22, 2013.

(30) Foreign Application Priority Data

Jan. 26, 2012  (KR) .................. 10-2012-0007513

(51) Int. Cl.
| | |
|---|---|
| *H01M 10/625* | (2014.01) |
| *H01M 10/61* | (2014.01) |
| *H01M 10/6551* | (2014.01) |
| *H01M 10/647* | (2014.01) |
| *H01M 10/6556* | (2014.01) |
| *H01M 10/6567* | (2014.01) |
| *H01M 10/613* | (2014.01) |
| *H01M 2/10* | (2006.01) |

(52) U.S. Cl.
CPC ....... *H01M 10/5016* (2013.01); *H01M 10/61* (2015.04); *H01M 10/613* (2015.04); *H01M 10/625* (2015.04); *H01M 10/647* (2015.04); *H01M 10/6551* (2015.04); *H01M 10/6556* (2015.04); *H01M 10/6567* (2015.04); *H01M 2/1077* (2013.01); *H01M 2220/20* (2013.01)

(58) Field of Classification Search
None
See application file for complete search history.

(56) References Cited

U.S. PATENT DOCUMENTS

| | | |
|---|---|---|
| 2007/0154799 A1 | 7/2007 | Yoon et al. |
| 2008/0090137 A1* | 4/2008 | Buck ............... H01M 2/1077 429/120 |
| 2009/0186265 A1 | 7/2009 | Koetting et al. |
| 2009/0220853 A1 | 9/2009 | Yang et al. |
| 2009/0305116 A1 | 12/2009 | Yang et al. |
| 2010/0021802 A1 | 1/2010 | Yang et al. |
| 2010/0285346 A1 | 11/2010 | Graban et al. |
| 2011/0008665 A1 | 1/2011 | Yoon et al. |
| 2011/0008666 A1 | 1/2011 | Yoon et al. |
| 2011/0059345 A1 | 3/2011 | Kim et al. |
| 2011/0070474 A1 | 3/2011 | Lee et al. |
| 2011/0262792 A1 | 10/2011 | Lee et al. |
| 2011/0287285 A1 | 11/2011 | Yoon |
| 2011/0318623 A1 | 12/2011 | Lee et al. |
| 2012/0171532 A1 | 7/2012 | Lee et al. |

FOREIGN PATENT DOCUMENTS

| | | |
|---|---|---|
| CN | 201887133 U | 6/2011 |
| CN | 102257653 A | 11/2011 |
| DE | 10 2010 005 154 A1 | 7/2011 |
| JP | 2008-47371 A | 2/2008 |
| JP | 2009-510687 A | 3/2009 |
| JP | 2009-140714 A | 6/2009 |
| JP | 2009-529216 A | 8/2009 |
| JP | 2009-529217 A | 8/2009 |
| JP | 2009-529218 A | 8/2009 |
| JP | 2009-283148 A | 12/2009 |
| JP | 2010-218716 A | 9/2010 |
| JP | 2010-287487 A | 12/2010 |
| JP | 2011-503793 A | 1/2011 |
| JP | 2011-504286 A | 2/2011 |
| JP | 2012-507829 A | 3/2012 |
| KR | 10-2008-0027504 A | 3/2008 |
| KR | 10-2009-0079802 A | 7/2009 |
| KR | 10-2010-0109871 A | 10/2010 |
| KR | 10-2011-0026048 A | 3/2011 |
| KR | 10-2011-0080537 A | 7/2011 |
| KR | 10-2011-0128639 A | 11/2011 |

OTHER PUBLICATIONS

International Search Report issued in PCT/KR2013/000497, dated Apr. 29, 2013.

* cited by examiner

*Primary Examiner* — Ladan Mohaddes
(74) *Attorney, Agent, or Firm* — Birch, Stewart, Kolasch & Birch, LLP

(57) ABSTRACT

Disclosed herein is a battery module including chargeable and dischargeable battery cells mounted in a module case, wherein the battery cells are mounted in the module case in a state in which the battery cells are stacked in a lateral direction in which electrode terminals are not located, the module case is configured to have a frame structure open at one or more surfaces thereof, the module case including a receiving part to mount the battery cells, and a heat dissipation support member to dissipate heat from the battery cells through thermal conduction based on direct or indirect contact with the battery cells is mounted in the receiving part, in which the battery cells are mounted.

18 Claims, 11 Drawing Sheets

[FIG. 1]
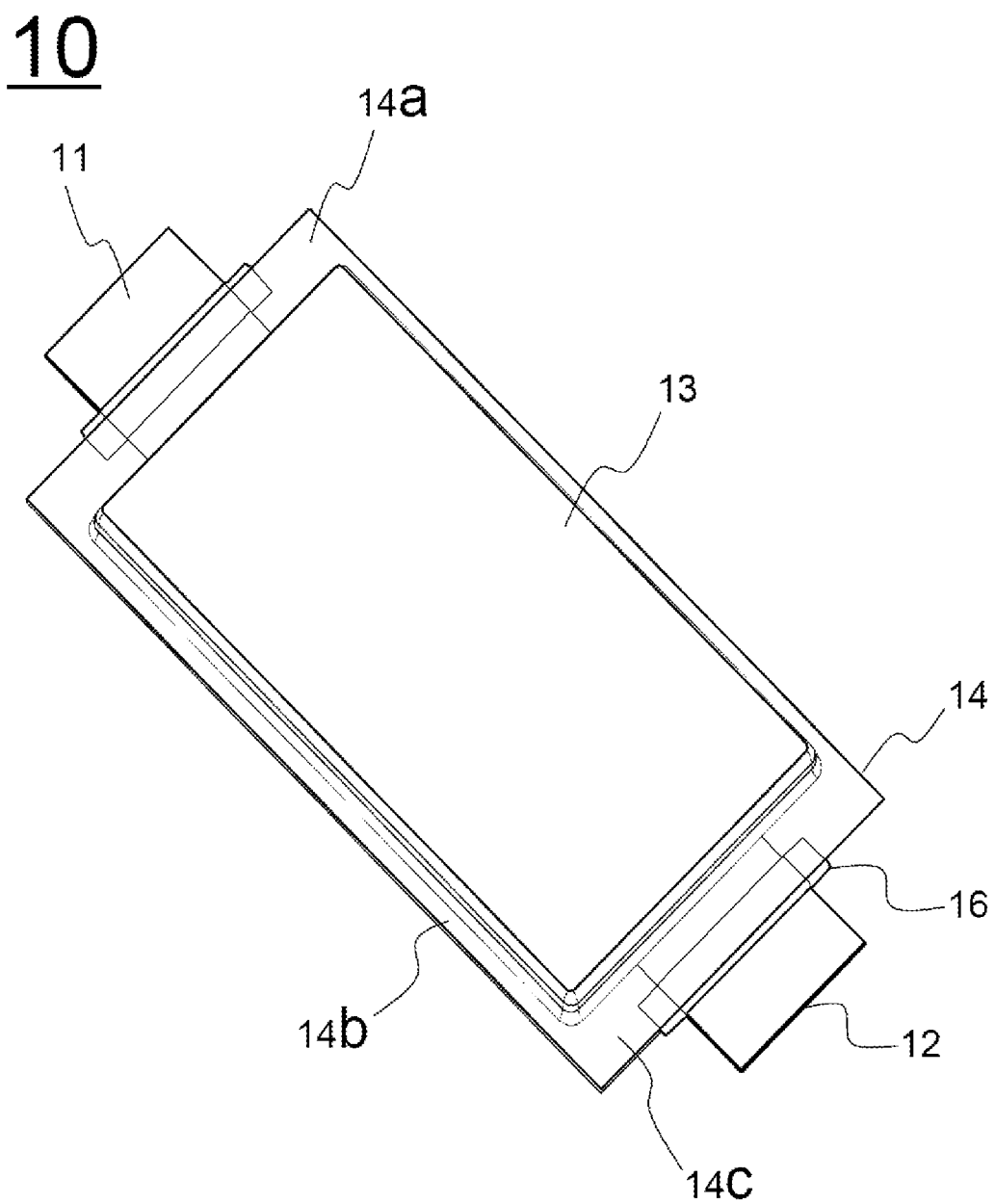

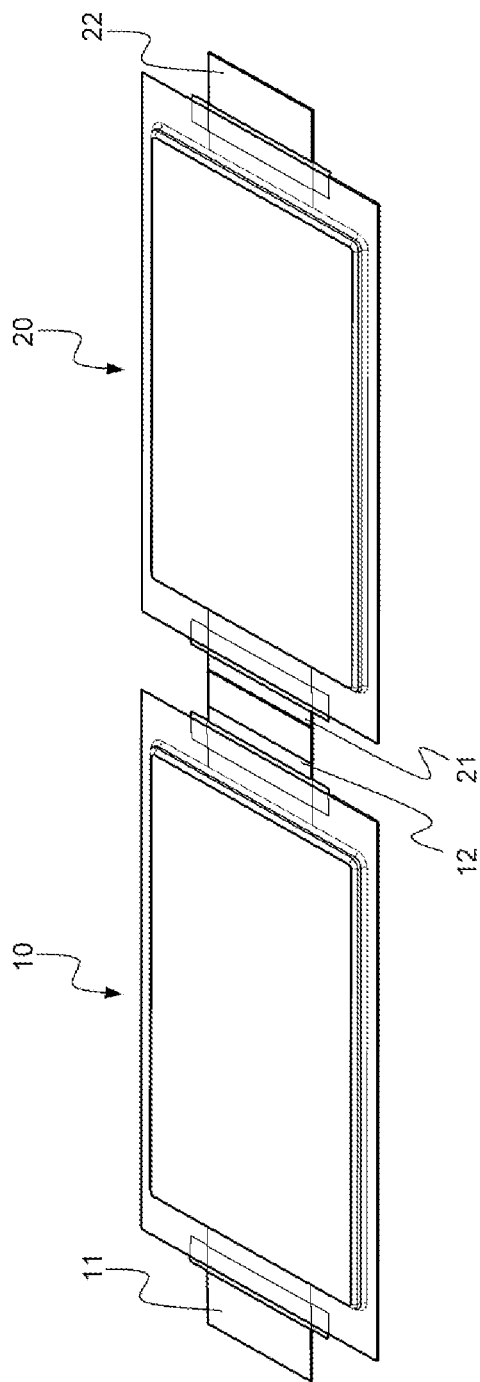
[FIG. 2]

[FIG. 3]
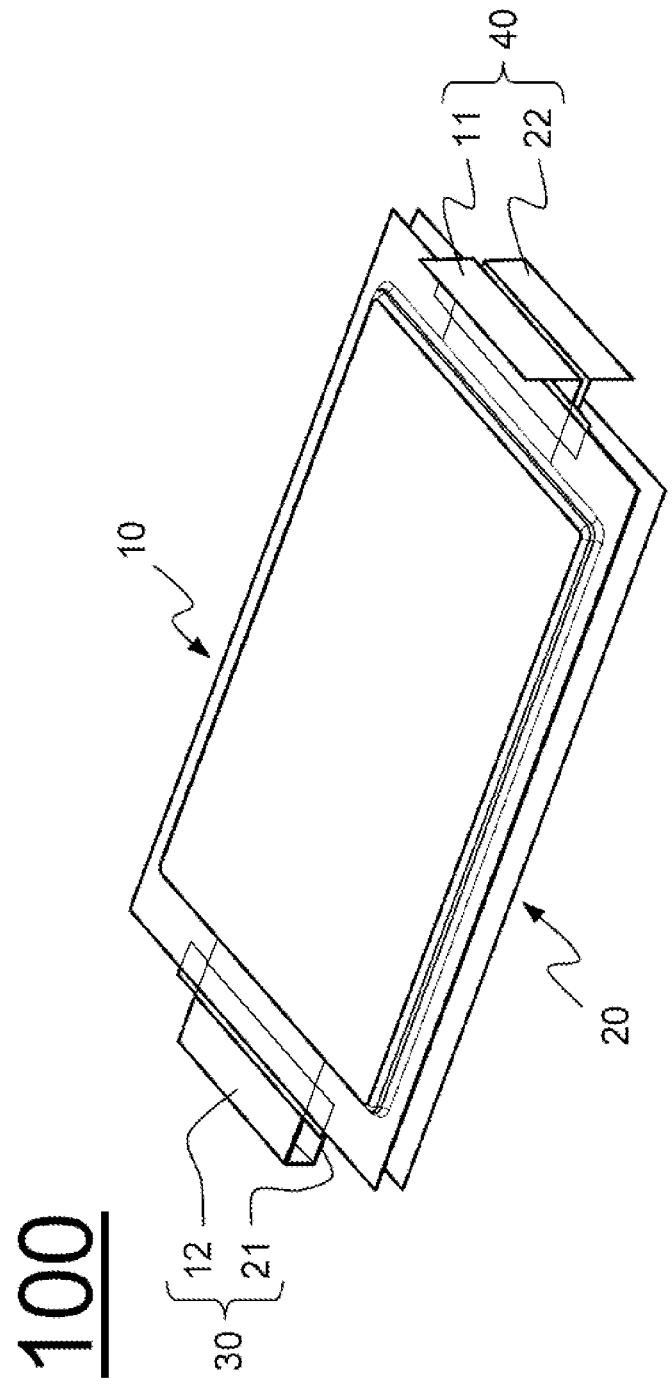

[FIG. 4]
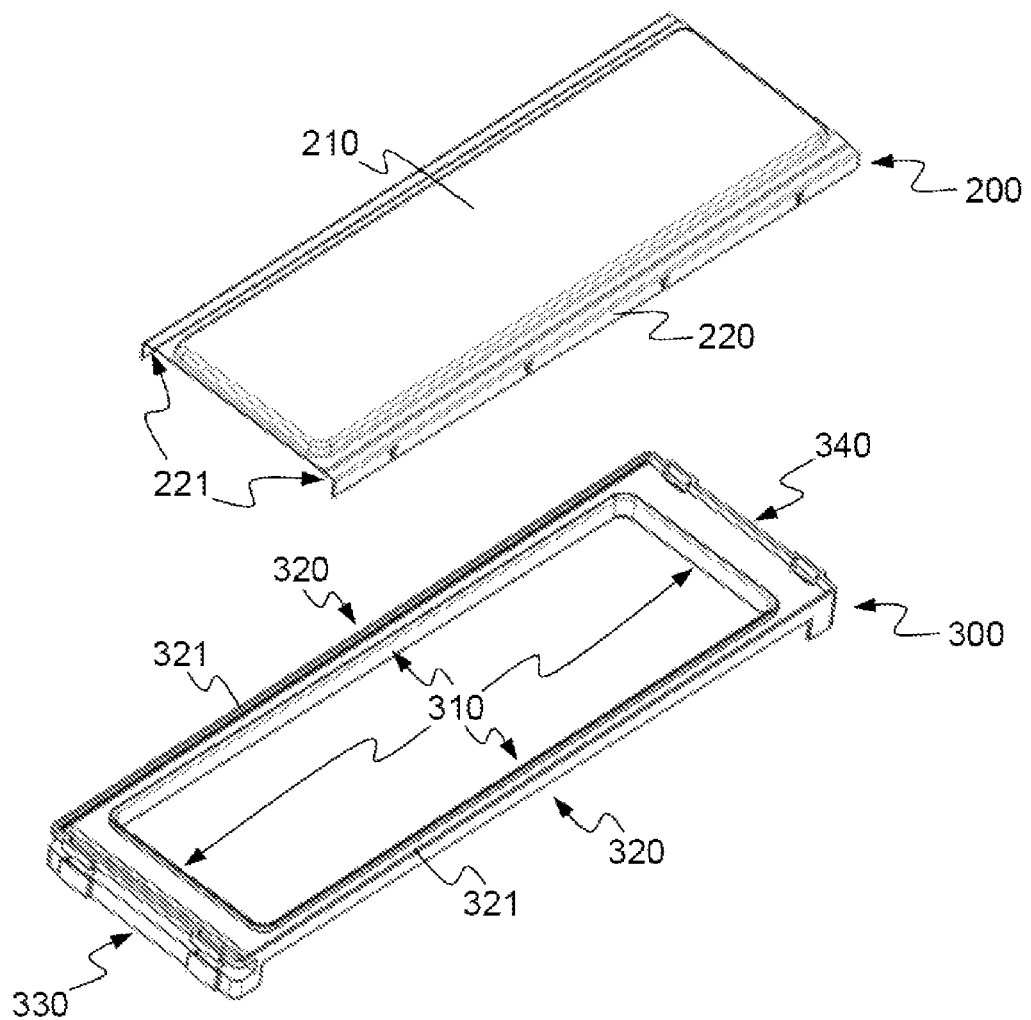

[FIG. 5]
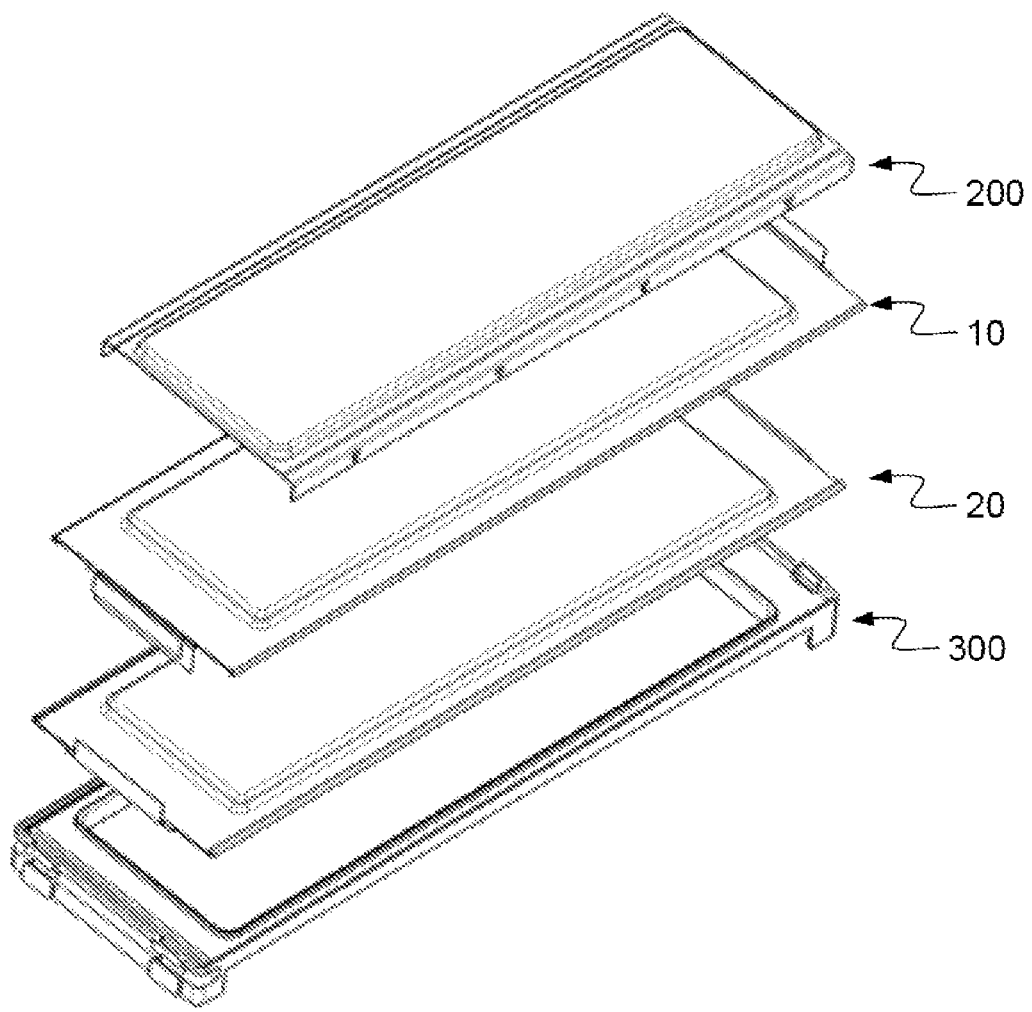

[FIG. 6]
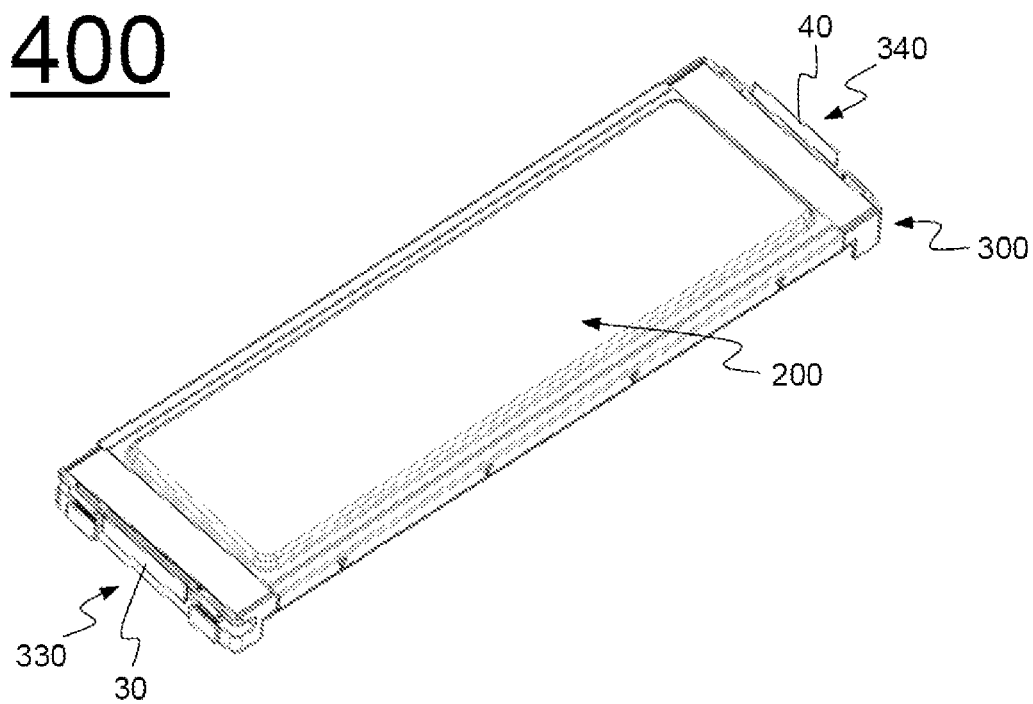

[FIG. 7]
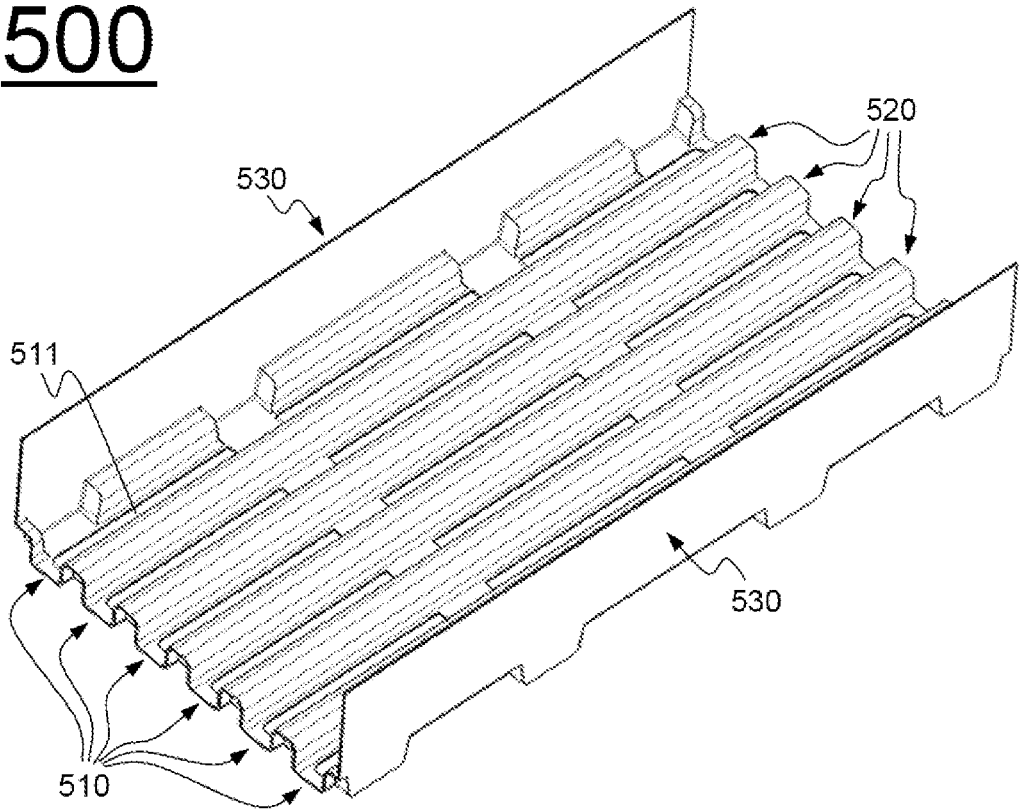

[FIG. 8]
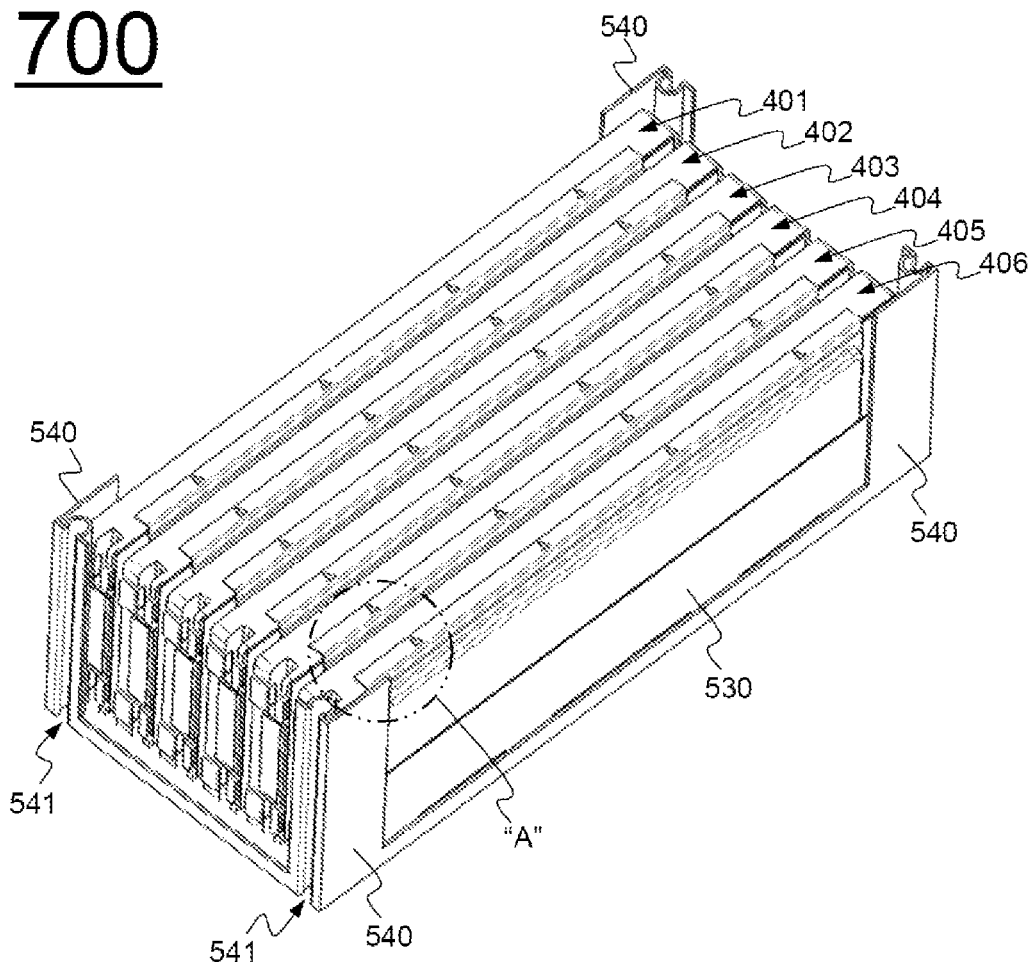

【FIG. 9】
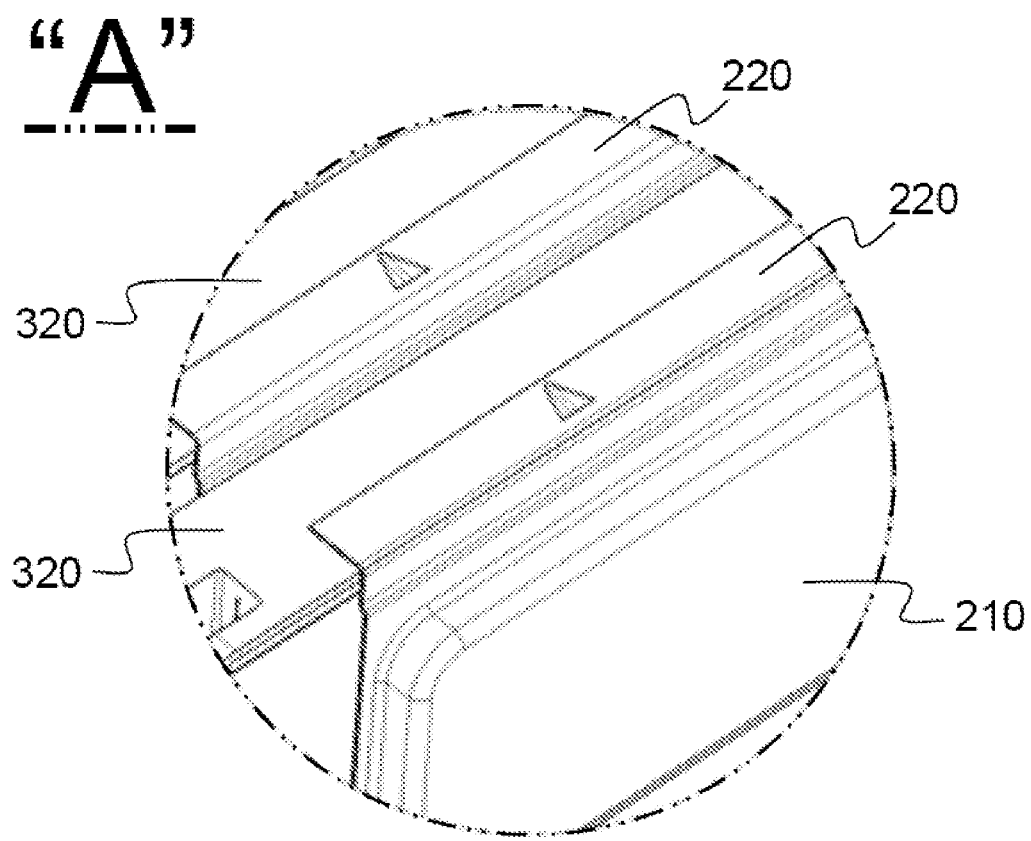

[FIG. 10]
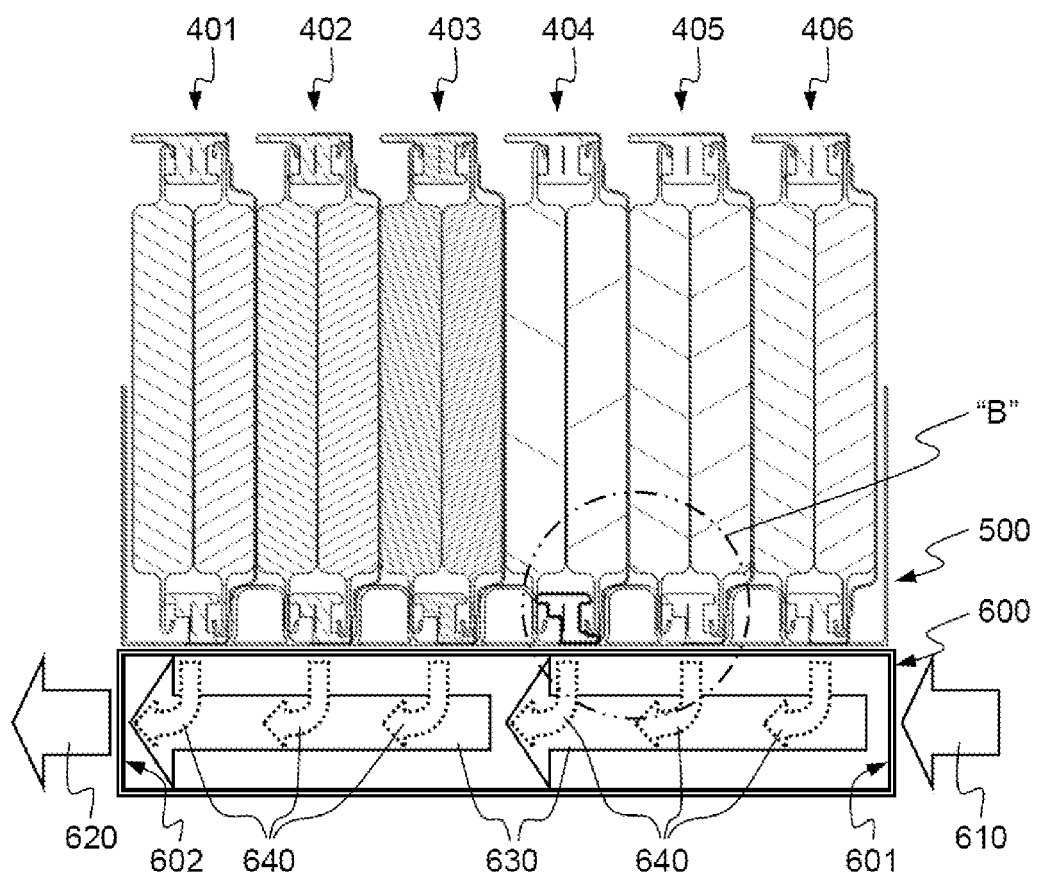

[FIG. 11]
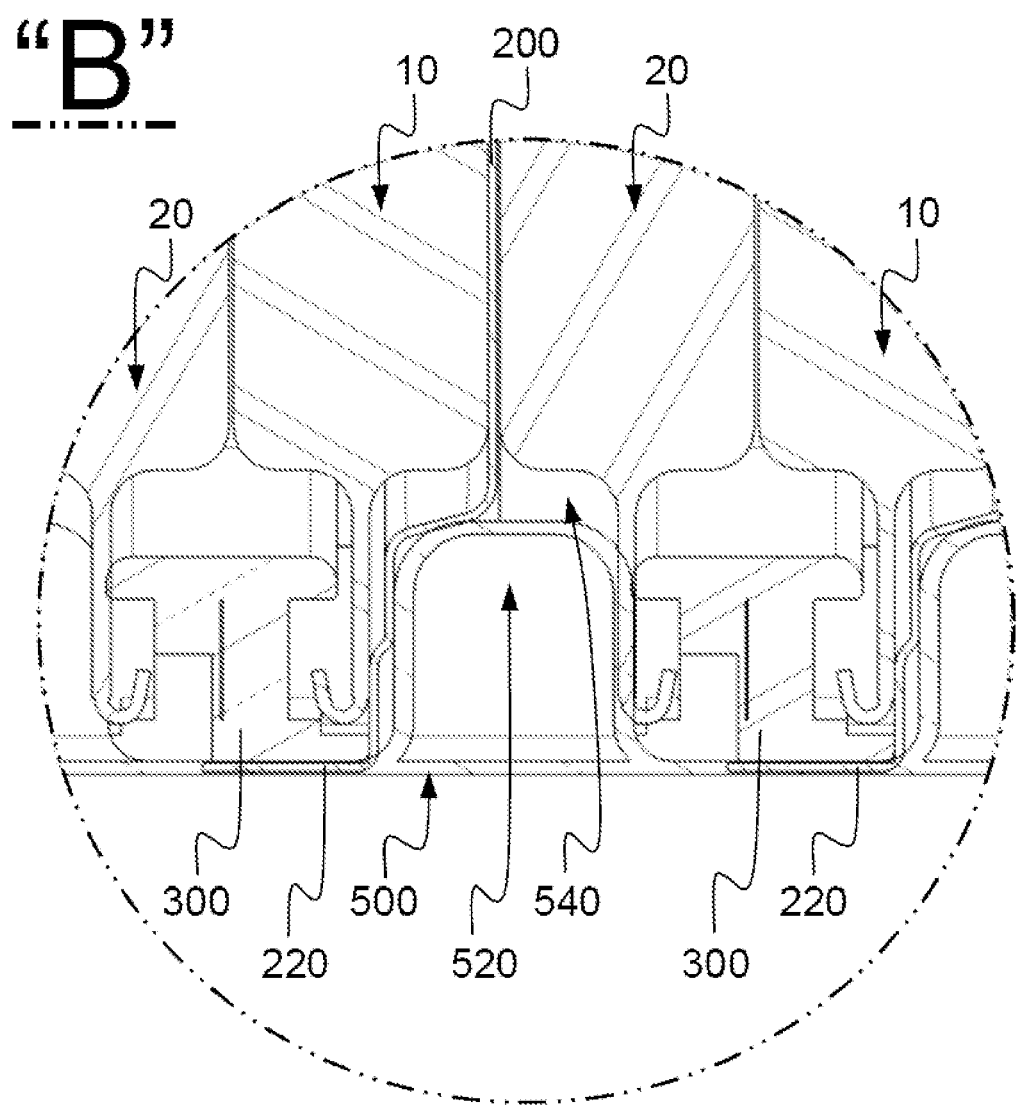

BATTERY MODULE WITH NOVEL STRUCTURE

CROSS REFERENCE TO RELATED APPLICATIONS

This application is a Continuation of PCT International Application No. PCT/KR2013/000497 filed on Jan. 22, 2013, which claims priority under 35 U.S.C. § 119(a) to Patent Application No. 10-2012-0007513 filed in the Republic of Korea on Jan. 26, 2012, all of which are hereby expressly incorporated by reference into the present application.

TECHNICAL FIELD

The present invention relates to a battery module having a novel structure and, more particularly, to a battery module including chargeable and dischargeable battery cells mounted in a module case, wherein the battery cells are mounted in the module case in a state in which the battery cells are stacked in a lateral direction in which electrode terminals are not located, the module case is configured to have a frame structure open at one or more surfaces thereof, the module case including a receiving part to mount the battery cells, and a heat dissipation support member to dissipate heat from the battery cells through thermal conduction based on direct or indirect contact with the battery cells is mounted in the receiving part, in which the battery cells are mounted.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-In HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on such a pouch-shaped battery, which uses an aluminum laminate sheet as a sheathing member, because the pouch-shaped battery is lightweight, the manufacturing cost of the pouch-shaped battery is low, and it is possible to easily modify the shape of the pouch-shaped battery.

FIG. 1 is a perspective view typically showing a conventional representative pouch-shaped battery. Referring to FIG. 1, the pouch-shaped battery 10 is configured to have a structure in which two electrode terminals 11 and 12 protrude from the upper end and the lower end of a battery body 13, respectively, such that the electrode terminals 11 and 12 are opposite to each other. A sheathing member 14 includes upper and lower sheathing parts. That is, the sheathing member 14 is a two-unit member. In a state in which an electrode assembly (not shown) is mounted in a receiving part which is defined between the upper and lower sheathing parts of the sheathing member 14, opposite sides 14a and upper and lower ends 14b and 14c, which are contact regions of the upper and lower sheathing parts of the sheathing member 14, are bonded to each other, whereby the pouch-shaped battery 10 is manufactured. The sheathing member 14 is configured to have a laminate structure of a resin layer/a metal foil layer/a resin layer. Consequently, it is possible to bond the opposite sides 14a and the upper and lower ends 14b and 14c of the upper and lower sheathing parts of the sheathing member 14, which are in contact with each other, to each other by applying heat and pressure to the opposite sides 14a and the upper and lower ends 14b and 14c of the upper and lower sheathing parts of the sheathing member 14 so as to weld the resin layers thereof to each other. According to circumstances, the opposite sides 14a and the upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is achieved by welding. For the upper and lower ends 14b and 14c of the sheathing member 14, on the other hand, the electrode terminals 11 and 12 protrude from the upper and lower ends 14b and 14c of the sheathing member 14, respectively. For this reason, the upper and lower ends 14b and 14c of the upper and lower sheathing parts of the sheathing member 14 are thermally welded to each other, in a state in which a film type sealing member 16 is interposed between the electrode terminals 11 and 12 and the sheathing member 14, in consideration of the thickness of the electrode terminals 11 and 12 and the difference in material between the electrode terminals 11 and 12 and the sheathing member 14, so as to improve sealability of the sheathing member 14.

However, the mechanical strength of the sheathing member 14 is low. For this reason, battery cells (unit batteries) are generally mounted in a pack case, such as a cartridge, to manufacture a battery module having a stable structure. However, a device or a vehicle, in which a middle or large-sized battery module is installed, has a limited installation space. Consequently, in a case in which the size of the battery module is increased due to the use of the pack case, such as the cartridge, the spatial utilization is lowered. In addition, the battery cells repeatedly expand and contract during charge and discharge of the battery cells due to the low mechanical strength of the battery cells. As a result, the thermally welded regions of the sheathing member may be easily separated from each other.

Meanwhile, battery cells constituting such a middle or large-sized battery module may be secondary batteries which can be charged and discharged. During charge and discharge of such a high-output, large-capacity secondary battery, therefore, a large amount of heat is generated from the battery. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a battery pack for vehicles, which is a high-output, large-capacity battery, needs a cooling system to cool battery cells mounted therein.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge, and a plurality of cartridges may be stacked to constitute a battery module. Coolant channels are defined between the stacked battery cells or between the stacked battery modules so that heat accumulated between the stacked battery cells or between the stacked battery modules can be effectively removed.

In this structure, however, it is necessary to provide a plurality of coolant channels corresponding to a plurality of battery cells with the result that the overall size of the battery module is increased.

In addition, intervals between the coolant channels are relatively narrowed as a plurality of battery cells is stacked in consideration of the size of the battery module. As a result, design of the cooling structure is complicated. That is, high pressure loss is caused by the coolant channels arranged at intervals narrower than a coolant inlet port with the result that it is difficult to design shapes and positions of the coolant inlet port and a coolant outlet port. In addition, a fan may be further provided to prevent such pressure loss. In this case, however, design may be restricted due to power consumption, fan noise, space, or the like.

Furthermore, cooling efficiency based on design may not be acquired due to thermal conduction resistance existing between members used to constitute the cooling structure.

Therefore, there is a high necessity for a battery module which can be manufactured to have a simple and compact structure while providing high-output, large-capacity power and exhibits excellent lifespan characteristics and stability.

DISCLOSURE

Technical Problem

Therefore, the present invention has been made to solve the above problems and other technical problems that have yet to be resolved.

Specifically, it is an object of the present invention to provide a battery module configured to have a structure in which heat from the battery module is removed by water-cooled or air-cooled thermal conduction such that overall temperature of the battery module is uniformalized while the increase in overall size of the battery module is restrained, whereby temperature deviation of the battery module is reduced.

It is another object of the present invention to provide a battery module configured such that thermal conduction resistance existing between members used to constitute the battery module is minimized, whereby cooling efficiency in the same structure is maximized.

TECHNICAL SOLUTION

In accordance with one aspect of the present invention, the above and other objects can be accomplished by the provision of a battery module including chargeable and dischargeable battery cells mounted in a module case, wherein the battery cells are mounted in the module case in a state in which the battery cells are stacked in a lateral direction in which electrode terminals are not located, the module case is configured to have a frame structure open at one or more surfaces thereof, the module case including a receiving part to mount the battery cells, and a heat dissipation support member to dissipate heat from the battery cells through thermal conduction based on direct or indirect contact with the battery cells is mounted in the receiving part, in which the battery cells are mounted.

As previously described, a general battery module is configured to have a structure in which battery cells are stacked in a state in which the battery cells are apart from each other by a predetermined distance to form coolant channels such that air flows through spaces defined between the battery cells (in an air-cooled fashion) to prevent overheating of the battery cells. However, a heat dissipation effect is not satisfactory.

On the other hand, the battery module according to the present invention includes a module case and a heat dissipation support member each of which have a specific shape. Consequently, it is possible to cool the battery cell stack with higher efficiency than a conventional cooling system without the provision of spaces between the battery cells or with very small spaces between the battery cells. As a result, it is possible to maximize heat dissipation efficiency of the battery module and to stack the battery cells with high integration.

In the present invention, each of the battery cells may have electrode terminals formed at one end or opposite ends thereof. Preferably, each of the battery cells is a plate-shaped battery cell. That is, each of the battery cells is a secondary battery cell having a small thickness and a relatively large width and length so as to minimize the overall size of a battery module when the battery cells are stacked to constitute the battery module.

In a preferred example of the secondary battery, each of the battery cells may be a secondary battery cell configured to have a structure in which an electrode assembly of a cathode/separator/anode structure is mounted in a battery case formed of a laminate sheet including a resin layer and a metal layer and a cathode terminal and an anode terminal protrude from opposite ends of the battery case. Specifically, the electrode assembly may be mounted in a pouch-shaped case formed of an aluminum laminate sheet. The secondary battery cell with the above-described structure may also be referred to as a pouch-shaped battery cell.

In a preferred example, at least one plate-shaped battery cell may be mounted in a cell case to constitute a unit module and the cell case may include a cover having an inner surface directly contacting the plate-shaped battery cell and an outer surface directly contacting the heat dissipation support member of the module case, the cover being made of a metal material.

Preferably, the unit module includes two or more battery cells connected to each other in series.

The material for the cover is not particularly restricted so long as the cover is made of a material exhibiting high thermal conductivity to absorb heat generated from the battery cells and transmit the absorbed heat to the heat dissipation support member. Preferably, the cover is made of aluminum.

Since the metal cover directly contacts the side of one of the plate-shaped battery cells, it is possible for the metal cover to rapidly and efficiently conduct heat generated from the battery cells. Consequently, it is possible to cool the battery cell stack with higher efficiency than the conventional system without the provision of spaces between the battery cells included in at least one unit module. As a result, it is possible to maximize heat dissipation efficiency of the battery module and to stack the battery cells with high integration.

Meanwhile, the cartridge may be configured to have a frame structure, open at the middle thereof, to fix an outer edge of the at least one plate-shaped battery cell. The cover may be provided at opposite ends thereof with bent fastening parts bent downward or upward so as to be fastened to the cartridge and the bent fastening parts of the cover and the cartridge may be coupled to each other using an assembly fastening method.

Coupling between the bent fastening parts of the cover and the cartridge using the assembly fastening method may be achieved, for example, by fastening protrusions or fastening grooves formed at the bent fastening parts of the cover and fastening grooves or fastening protrusions formed at the cartridge, the fastening grooves or fastening protrusions of the cartridge corresponding to the fastening protrusions or fastening grooves of the bent fastening parts of the cover.

The assembly fastening method does not need additional fastening members. As a result, an additional space to mount the additional fastening members is not needed and an additional process of mounting the additional fastening members is not needed. Consequently, it is possible to manufacture a battery module having a compact structure through an efficient assembly process.

Meanwhile, the sheathing material of each battery cell has low mechanical strength. In order to manufacture a battery module having a stable structure, therefore, the main body of the module case and/or the cartridge is made of an electrically insulative material exhibiting high mechanical strength. Preferably, the main body of the module case and/or the cartridge may be made of a plastic material. Consequently, it is possible to protect the battery cells mounted in the cartridge from external mechanical impact and, at the same time, to stably mount the battery cells in the battery module.

Preferably, each of the battery cells is a plate-shaped battery cell having electrode terminals formed at opposite ends thereof. The battery cells may be stacked in the lateral direction such that the electrode terminals of the battery cells are directed to a front and a rear of the module case to constitute a battery cell stack. A main body of the module case may include side support parts extending upward to support side edges of the battery cell stack in a state in which the top and opposite sides of the main body are exposed.

Each of the side support parts may be provided at the outer surface thereof with a groove vertically extending to fix the battery cell stack and fasten another battery module or a device.

Coupling between the main body of the module case and the heat dissipation support member may be achieved using various methods.

For example, the heat dissipation support member may be mounted in the main body of the module case by insert injection molding such that the top of the heat dissipation support member is exposed to the battery cells and the bottom of the heat dissipation support member is exposed outside.

In another example, the heat dissipation support member may be coupled to the main body of the module case using an assembly fastening method. The assembly fastening method may include coupling between fastening protrusions and fastening grooves and bonding. However, the present invention is not limited thereto.

The material for the heat dissipation support member is not particularly restricted so long as the heat dissipation support member can absorb heat generated from the battery cells and dissipate the absorbed heat outside. Preferably, the heat dissipation support member is formed of a metal sheet.

Preferably, the above structure includes a mount having a concavo-convex structure in which the battery cells are mounted.

In a concrete example, the heat dissipation support member, manufactured by insert injection molding as described above, may include a mount having a concavo-convex structure in which the battery cells are mounted and have opposite side ends bent upward to surround the lower end of the battery cell stack and to at least partially surround opposite side surfaces of the battery cell stack. In addition, the upwardly bent parts may be provided with insulative side support parts. Consequently, it is possible to obtain mechanical strength, high thermal conduction rate, and conductivity, which are provided by metal, and, at the same time, to achieve electric insulation, coloring, high flexibility, and processability of the insulative member.

In addition, an additional member to fasten the metal material to the insulative material is not needed since the dissipation support member is manufactured by insert injection molding. As a result, an additional space to mount the additional member is not needed and an additional process of mounting the additional member is not needed. Consequently, it is possible to achieve an efficient assembly process of the battery module.

In a preferred example, the battery module may further include an air-cooled or water-cooled heat exchange member mounted at the lower end of the heat dissipation support member. As a result, heat generated from the battery cells during charge and discharge of the battery cells is removed by thermal conduction through the heat exchange member via the heat dissipation support member. Consequently, the battery module exhibits more excellent cooling characteristics.

According to circumstances, a thermally conductive medium may be disposed at contact interfaces between the battery cells and the module case or in spaces between the respective battery cells. The thermally conductive medium is not particularly restricted so long as the thermally conductive medium is formed of a material exhibiting high thermal conductivity. For example, the thermally conductive medium may be at least one selected from a group consisting of thermally conductive grease, thermally conductive epoxy-based bond, a thermally conductive silicone pad, thermally conductive adhesive tape, and a graphite sheet.

In accordance with another aspect of the present invention, there is provided a battery pack including one or more battery modules with the above-stated construction mounted in a pack case.

In accordance with a further aspect of the present invention, there is provided a device including such a battery pack as a power source. Specifically, the device may be an electric vehicle, a hybrid electric vehicle, a plug-in hybrid electric vehicle, or a power storage device.

The structure and a manufacturing method of the device are well known in the art to which the present invention pertains and, therefore, a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery cell constituting a unit module according to the present invention;

FIGS. 2 and 3 are perspective views showing a process of bending a pair of battery cells constituting a unit module according to the present invention;

FIGS. 4 and 5 are exploded views showing a cell case according to the present invention;

FIG. 6 is a perspective view showing the cell case according to the present invention;

FIG. 7 is a perspective view showing a heat dissipation support member according to the present invention;

FIG. 8 is a perspective view showing a battery module according to the present invention;

FIG. 9 is a partially enlarged view of FIG. 8;

FIG. 10 is a side view typically showing a state in which a heat exchange member is mounted at the battery module according to the present invention; and FIG. 11 is a partially enlarged view of FIG. 10.

BEST MODE

Now, preferred embodiments of the present invention will be described in detail with reference to the accompanying drawings. It should be noted, however, that the scope of the present invention is not limited by the illustrated embodiments.

FIG. 1 is a perspective view showing an exemplary battery cell constituting a unit module according to the present invention.

Referring to FIG. 1, a pouch-shaped battery 10 is configured to have a structure in which two electrode terminals 11 and 12 protrude from opposite ends of a battery body 13, respectively, such that the electrode terminals 11 and 12 are opposite to each other.

A sheathing material 14 is a laminate sheet having a laminate structure of a resin layer/a metal foil layer/a resin layer. An electrode assembly (not shown) is mounted in a pouch-shaped case made of the sheathing material 14.

FIGS. 2 and 3 are perspective views showing a process of bending a pair of battery cells constituting a unit module according to the present invention.

Referring to these drawings, in a state in which two pouch-shaped battery cells 10 and 20 are arranged in series in the longitudinal direction such that electrode terminals 12 and 21 of the battery cells 10 and 20 are adjacent to each other, the electrode terminals 12 and 21 of the battery cells 10 and 20 are coupled (30) to each other by welding and then the battery cells 10 and 20 are bent such that the battery cells 10 and 20 overlap each other. According to circumstances, in a state in which the battery cells 10 and 20 are disposed such that the battery cells 10 and 20 overlap each other, the electrode terminals 12 and 21 of the battery cells 10 and 20 are coupled (30) to each other by welding.

FIGS. 4 and 5 are exploded views showing a cell case according to the present invention and FIG. 6 is a perspective view showing the cell case.

Referring to these drawings, a cell case 400 includes a cartridge 300 and a cover 200. Two plate-shaped battery cells 10 and 20 are mounted in the cell case 400 to constitute one unit module 100. Specifically, the cell case 400 includes a cartridge 300 in which two plate-shaped battery cells 10 and 20 are mounted in a state in which the outer surfaces of the battery cells 10 and 20 are exposed and a cover 200 fastened to the cartridge 300 such that the cover 200 surrounds the battery cells 10 and 20 excluding electrode terminals 30 and 40 of the battery cells 10 and 20.

The cartridge 300 is configured to have a frame structure 320, open at the middle thereof, to fix outer edges of the battery cells 10 and 20. The cartridge 300 is made of an electrically insulative material, such as plastic.

The cover 200 is a plate-shaped structure, the inner surface of which directly contacts the battery cell 10 and the outer surface of which directly contacts a heat dissipation support member 500. The cover 200 is made of a metal material.

The cover 200 is provided at opposite ends thereof with bent fastening parts 220 which are bent downward so as to be fastened to the cartridge 300. The bent fastening parts 220 of the cover 200 and the cartridge 300 are coupled to each other using an assembly fastening method.

Coupling between the bent fastening parts 220 of the cover 200 and the cartridge 300 using such an assembly fastening method is achieved by fastening grooves 321 formed at the cartridge 300, the fastening grooves 321 corresponding to the bent fastening parts 220 of the cover 200.

FIG. 7 is a perspective view showing a heat dissipation support member according to an embodiment of the present invention, FIG. 8 is a perspective view showing a battery module according to an embodiment of the present invention, and FIG. 9 is a partially enlarged view of FIG. 8.

Referring to these drawings, unit modules 401, 402, 403, 404, 405, 406, and 407 are mounted at a mount 510, having a concavo-convex structure 510 and 520, of a heat dissipation support member 500 in a state in which the unit modules 401, 402, 403, 404, 405, 406, and 407 are stacked in the lateral direction.

A battery module 700 includes side support parts 540 extending upward to support side edges of the unit modules 401, 402, 403, 404, 405, 406, and 407 such that the top and opposite sides of the battery module 700 are exposed. Each of the side support parts 540 is provided at the outer surface thereof with a groove 541 vertically extending to fix the unit modules 401, 402, 403, 404, 405, 406, and 407 and fasten other battery modules or devices.

The heat dissipation support member 500 has opposite side ends 530 bent upward to surround the lower ends of the unit modules 401, 402, 403, 404, 405, 406, and 407 and to at least partially surround opposite side surfaces of the unit modules 401, 402, 403, 404, 405, 406, and 407.

FIG. 10 is a side view typically showing a state in which a heat exchange member is mounted at the battery module according to the present invention and FIG. 11 is a partially enlarged view of FIG. 10.

Referring to these drawings, a water-cooled heat exchange member 600 is mounted at the lower end of the heat dissipation support member 500 in the battery module 700 such that heat generated from the battery cells 10 and 20 during charge and discharge of the battery cells 10 and 20 can be removed by thermal conduction through the heat exchange member 600 via the heat dissipation support member 500.

Specifically, a coolant (not shown) is introduced (610) through a coolant inlet port 601 of the heat exchange member 600. The coolant passes (630) through the heat dissipation support member 500. At this time, the coolant absorbs (640) heat from the heat dissipation support member 500. The coolant having absorbed the heat is discharged (620) through a coolant outlet port 602 of the heat exchange member 600.

According to circumstances, a thermally conductive medium 540 may be disposed at contact interfaces 220 between the heat dissipation support member 500 and the unit modules 401, 402, 403, 404, 405, 406, and 407 or in spaces 540 between the respective unit modules 401, 402, 403, 404, 405, 406, and 407.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module according to the present invention includes a module case and a heat dissipation support member each of which have a specific shape. Consequently, it is possible to effectively discharge heat generated from battery cells out of the battery module while minimizing the increase in size of the battery module.

The invention claimed is:

1. A battery module comprising chargeable and dischargeable battery cells mounted in a module case, wherein
    the chargeable and dischargeable battery cells are mounted in the module case in a state in which the chargeable and dischargeable battery cells are stacked in a lateral direction in which electrode terminals are not located,
    the module case is configured to have a frame structure open at one or more surfaces thereof, the module case comprising a receiving part to mount the chargeable and dischargeable battery cells, the receiving part defining a lower portion of the module case, and
    a heat dissipation support member to dissipate heat from the chargeable and dischargeable battery cells through thermal conduction based on direct or indirect contact with the chargeable and dischargeable battery cells is mounted in the receiving part, in which the chargeable and dischargeable battery cells are mounted such that the heat dissipation support member is located between the lower portion of the module case and the chargeable and dischargeable battery cells, the heat dissipation support member including a mount having a concavo-convex structure located in the receiving part defining the lower portion of the module case, and the chargeable and dischargeable battery cells are fitted into the concave portions of the concavo-convex structure.

2. The battery module according to claim 1, wherein each of the chargeable and dischargeable battery cells is a plate-shaped battery cell having electrode terminals formed at one end or opposite ends thereof.

3. The battery module according to claim 2, wherein the plate-shaped battery cell is a pouch-shaped battery cell configured to have a structure in which an electrode assembly is mounted in a pouch-shaped case formed of a laminate sheet comprising a metal layer and a resin layer.

4. The battery module according to claim 2, wherein
    at least one plate-shaped battery cell is mounted in a cell case to constitute a unit module, and
    the cell case comprises a cover having an inner surface directly contacting the plate-shaped battery cell and an outer surface directly contacting the heat dissipation support member of the module case, the cover being made of a metal material.

5. The battery module according to claim 4, wherein the cell case comprises a cartridge in which the at least one plate-shaped battery cell is mounted in a state in which one surface or both surfaces of the at least one plate-shaped battery cell are exposed, and a cover fastened to the cartridge such that the cover surrounds the at least one plate-shaped battery cell excluding electrode terminals of the at least one plate-shaped battery cell.

6. The battery module according to claim 5, wherein the cartridge is configured to have a frame structure, open at a middle thereof, to fix an outer edge of the at least one plate-shaped battery cell.

7. The battery module according to claim 5, wherein the cover is provided at opposite ends thereof with bent fastening parts bent downward or upward so as to be fastened to the cartridge, and the bent fastening parts of the cover and the cartridge are coupled to each other using an assembly fastening method.

8. The battery module according to claim 7, wherein coupling between the bent fastening parts of the cover and the cartridge using the assembly fastening method is achieved by fastening protrusions or fastening grooves formed at the bent fastening parts of the cover and fastening grooves or fastening protrusions formed at the cartridge, the fastening grooves or fastening protrusions of the cartridge corresponding to the fastening protrusions or fastening grooves of the bent fastening parts of the cover.

9. The battery module according to claim 4, wherein the unit module comprises two or more chargeable and dischargeable battery cells connected to each other in series.

10. The battery module according to claim 1, wherein
    each of the chargeable and dischargeable battery cells is a plate-shaped battery cell having electrode terminals formed at opposite ends thereof,
    the chargeable and dischargeable battery cells are stacked in the lateral direction such that the electrode terminals of the chargeable and dischargeable battery cells are directed to a front and a rear of the module case to constitute a battery cell stack, and
    a main body of the module case comprises side support parts extending upward to support side edges of the battery cell stack in a state in which a top and opposite sides of the main body are exposed.

11. The battery module according to claim 10, wherein each of the side support parts is provided at an outer surface thereof with a groove vertically extending to fix the battery cell stack and fasten another battery module or a device.

12. The battery module according to claim 1, wherein the heat dissipation support member is mounted in a main body of the module case by insert injection molding such that a top of the heat dissipation support member is exposed to the chargeable and dischargeable battery cells and a bottom of the heat dissipation support member is exposed outside.

13. The battery module according to claim 1, wherein the heat dissipation support member is formed of a metal sheet.

14. The battery module according to claim 13, wherein the heat dissipation support member has opposite side ends bent upward to surround a lower end of the battery cell stack and to at least partially surround opposite side surfaces of the battery cell stack.

15. The battery module according to claim 1, further comprising:
    an air-cooled or water-cooled heat exchange member mounted at a lower end of the heat dissipation support member, wherein
    heat generated from the chargeable and dischargeable battery cells during charge and discharge of the chargeable and dischargeable battery cells is removed by thermal conduction through the heat exchange member via the heat dissipation support member.

16. A battery pack comprising one or more battery modules according to claim 1 mounted in a pack case.

17. A device comprising a battery pack according to claim 16 as a power source.

18. The vehicle according to claim 17, wherein the device is an electric vehicle, a hybrid electric vehicle, a plug-in hybrid electric vehicle, or a power storage device.

* * * * *